(12) United States Patent
Tseng

(10) Patent No.: US 6,516,908 B2
(45) Date of Patent: Feb. 11, 2003

(54) TRANSMISSION FOR AN ELECTRIC BICYCLE

(75) Inventor: Diing-Huang Tseng, Changhua Hsien (TW)

(73) Assignee: Merida Industry Co., Ltd., Changhua Hsien (TW)

( * ) Notice: Subject to any disclaimer, the term of this patent is extended or adjusted under 35 U.S.C. 154(b) by 69 days.

(21) Appl. No.: 09/853,461

(22) Filed: May 10, 2001

(65) Prior Publication Data

US 2002/0166708 A1 Nov. 14, 2002

(51) Int. Cl.[7] .............................................. B62K 11/00
(52) U.S. Cl. ..................... 180/206; 180/205; 180/207; 180/220
(58) Field of Search ................................. 180/205–207, 180/220, 65.1, 65.2, 65.5–65.7; 74/665 A, 665 B, 665 C, 665 E

(56) References Cited

U.S. PATENT DOCUMENTS 5,845,727 A * 12/1998 Miyazawa et al. .......... 180/205
5,857,537 A * 1/1999 Matsumoto et al. ........ 180/205
5,984,038 A * 11/1999 Fujiwara et al. ............ 180/205
6,012,538 A * 1/2000 Sonobe et al. .............. 180/206
6,073,717 A * 6/2000 Yamamoto et al. ......... 180/205
6,080,073 A * 6/2000 Liu et al. ....................... 475/4
6,263,993 B1 * 7/2001 Lin ............................. 180/206

* cited by examiner

Primary Examiner—Paul N. Dickson
Assistant Examiner—L. Lum
(74) Attorney, Agent, or Firm—Kolisch Hartwell, P.C.

(57) ABSTRACT

A transmission for an electric bicycle has a motor having an output axle extending into the housing and a driving gear secured on the output axle and engaged with an idler. A crank axle has a first non-return means assembled between the stepped sleeve and the driven gear, and a second non-return means assembled between the stepped sleeve and the crank axle. A seat has a first gear rotatably provided on the crank axle and having a first end secured in the second non-return means, a second gear secured on the crank axle, a duplicate gear engaged with the first gear and the second gear, and a nose provided on an outer surface of the seat. A force sensor is assembled on an inner wall of the housing and corresponding to the nose.

14 Claims, 6 Drawing Sheets

TRANSMISSION FOR AN ELECTRIC BICYCLE

BACKGROUND OF THE INVENTION

1. Field of the Invention

The present invention is related to an electrical bicycle, and more particularly to a transmission for an electrical bicycle.

2. Description of Related Art

A conventional transmission for an electric bicycle utilizes a planet gear assembly to transmit power from cranks. The structure of the planet gear is complex and requires a high manufacturing precision, so the cost of the planet gear is high. When the required velocity rate for different bicycles varies, the transmission needs to be replaced with another planet gear assembly. This also increases the manufacturing cost. Moreover, it is inconvenient for a manufacture to change a relative angle between the motor and a crank axle of the bicycle, because other elements must be redesigned in this situation.

Therefore, the invention provides a transmission for an electric bicycle to mitigate and/or obviate the aforementioned problems.

SUMMARY OF THE INVENTION

A main objective of the invention is to provide a transmission for an electric bicycle which has a simple and compact structure with a low cost.

Another objective of the invention is to provide a transmission for an electric bicycle which is able to change a relative angle between a motor and a crank axle.

Other objects, advantages and novel features of the invention will become more apparent from the following detailed description when taken in conjunction with the accompanying drawings.

DETAILED DESCRIPTION OF THE PREFERRED EMBODIMENT

Figure 1:
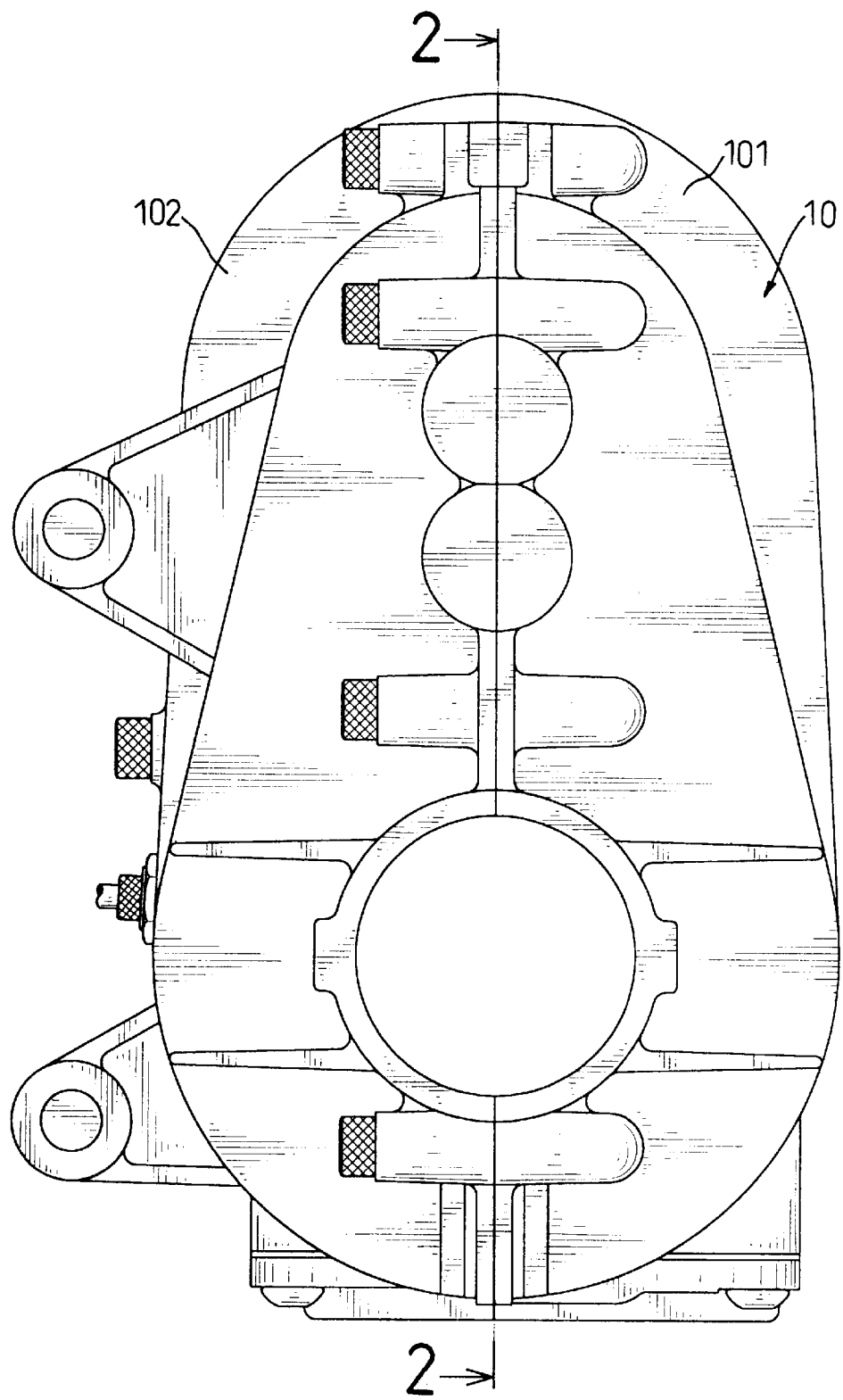
FIG. 1 is a front view of a transmission for an electric bicycle in accordance with the invention.
Figure 2:
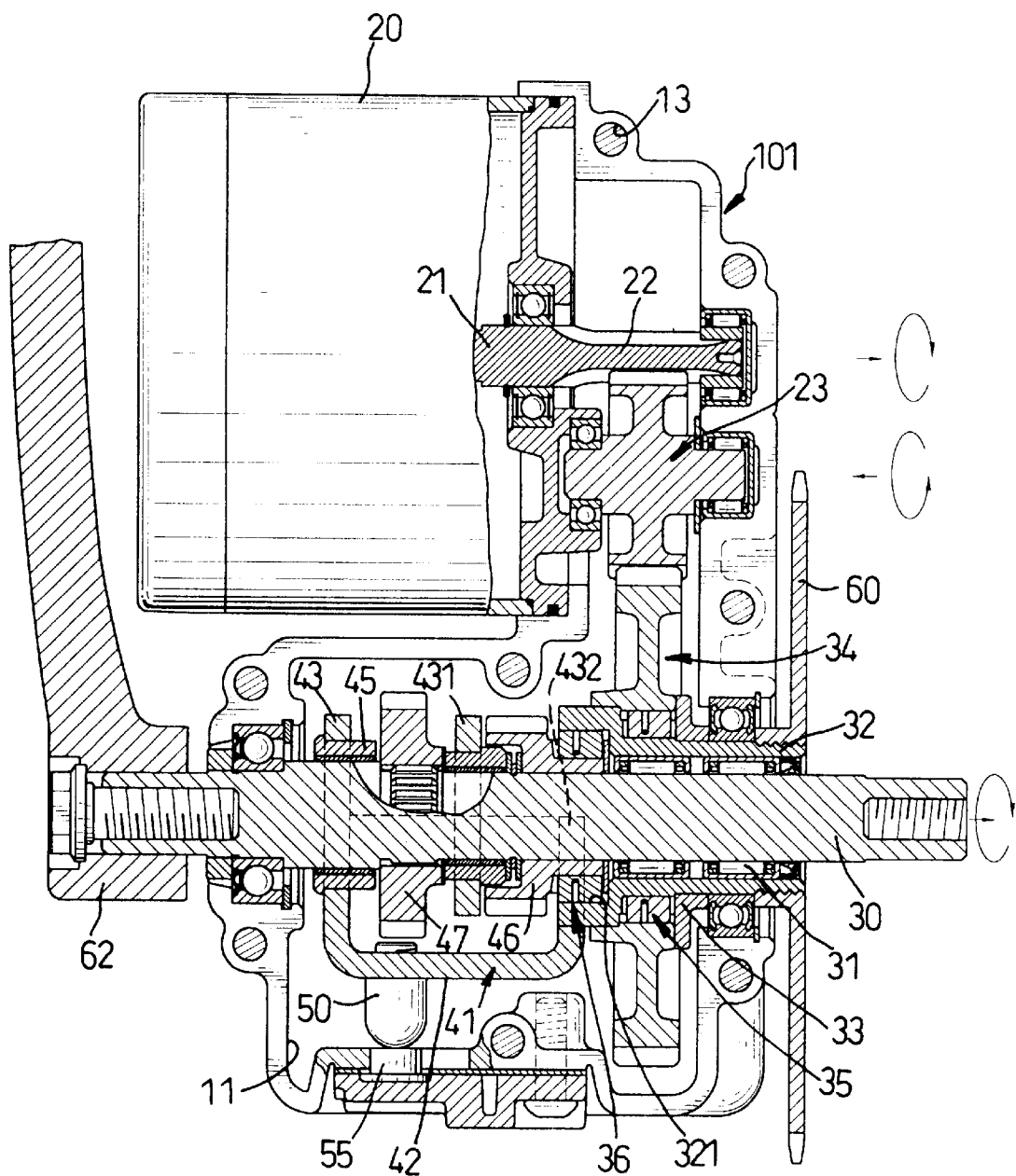
FIG. 2 is a side cross sectional view of FIG. 1 taken the line "2—2"

Referring to FIGS. 1 and 2, a transmission for an electrical bicycle in accordance with the present invention has a housing (10) coupled with a motor (20). The housing (10) is composed of two symmetrical semi-housings—a first semi-housing (101) and a second semi-housing (102) assembled with each other. For simplicity of description, only the first semi-housing (101) is described in detail. The second semi-housing (102) is completely symmetrical to the first one.

The first semi-housing (101) has a chamber (11) and a plurality of holes (13) defined at edges thereof. Via bolts inserted through these holes (13), the first semi-housing (101) and the second semi-housing (102) are combined to form the housing (10).

The motor (20) has an output axle (21) inserted in the housing (10) and a driving gear (22) is secured on the output axle (21). In this embodiment, the driving gear (22) is a spiral gear shaft with two teeth. The driving gear (22) is engaged with an idler (23).

A crank axle (30) transversally extends between the first semi-housing (101) and the second semi-housing (102) and is parallel to the output axle (21) of the motor (20). A pair of cranks (62) is assembled on two ends of the crank axle (30). A first bearing (31) is provided at a first end of the of the crank axle (30). A stepped sleeve (32) is provided on the first bearing (31) and is rotatable about the crank axle (30). The stepped sleeve (32) is also rotatable about the housing (10) by means of a second bearing (not numbered) provided between the stepped sleeve (32) and the housing (10). A first end of the stepped sleeve (32) extends out from the housing (10) and has a chain wheel (60) secured thereon.

A driven gear (34) is provided on a second end of the stepped sleeve (32) and separate from the second bearing on the stepped sleeve (32) by a distance sleeve (33). The driven gear (34) is engaged with the idler (23) and has a first non-return means (35) such as a non-return bearing or a ratchet wheel fitted between the stepped sleeve (32) and the driven gear (34). The stepped sleeve (32) further has a recess (321) defined at the second end thereof and has a second non-return means (36) fitted therein.

Figure 4:
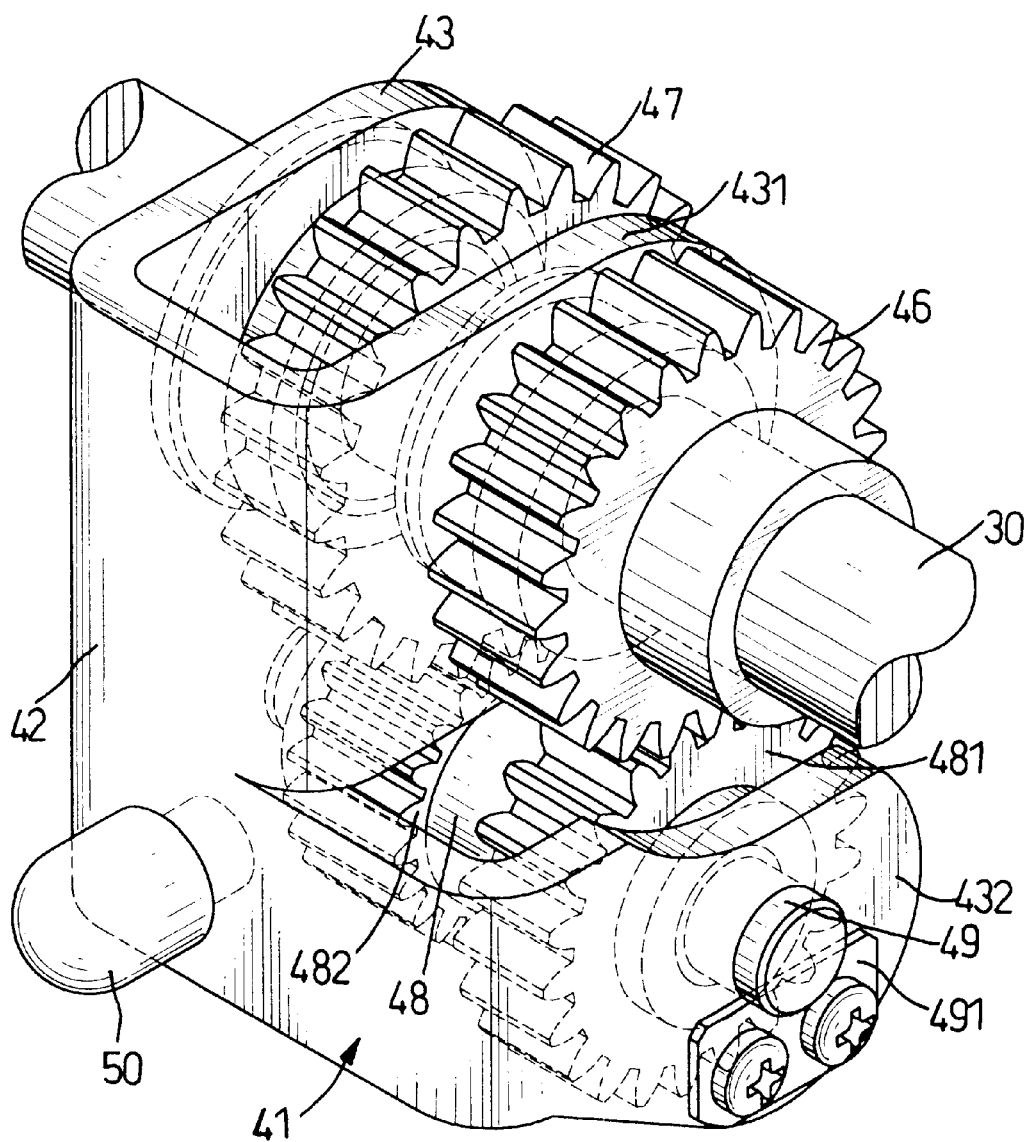
FIG. 4 is a perspective view of a seat assembled in the transmission.
Figure 6:
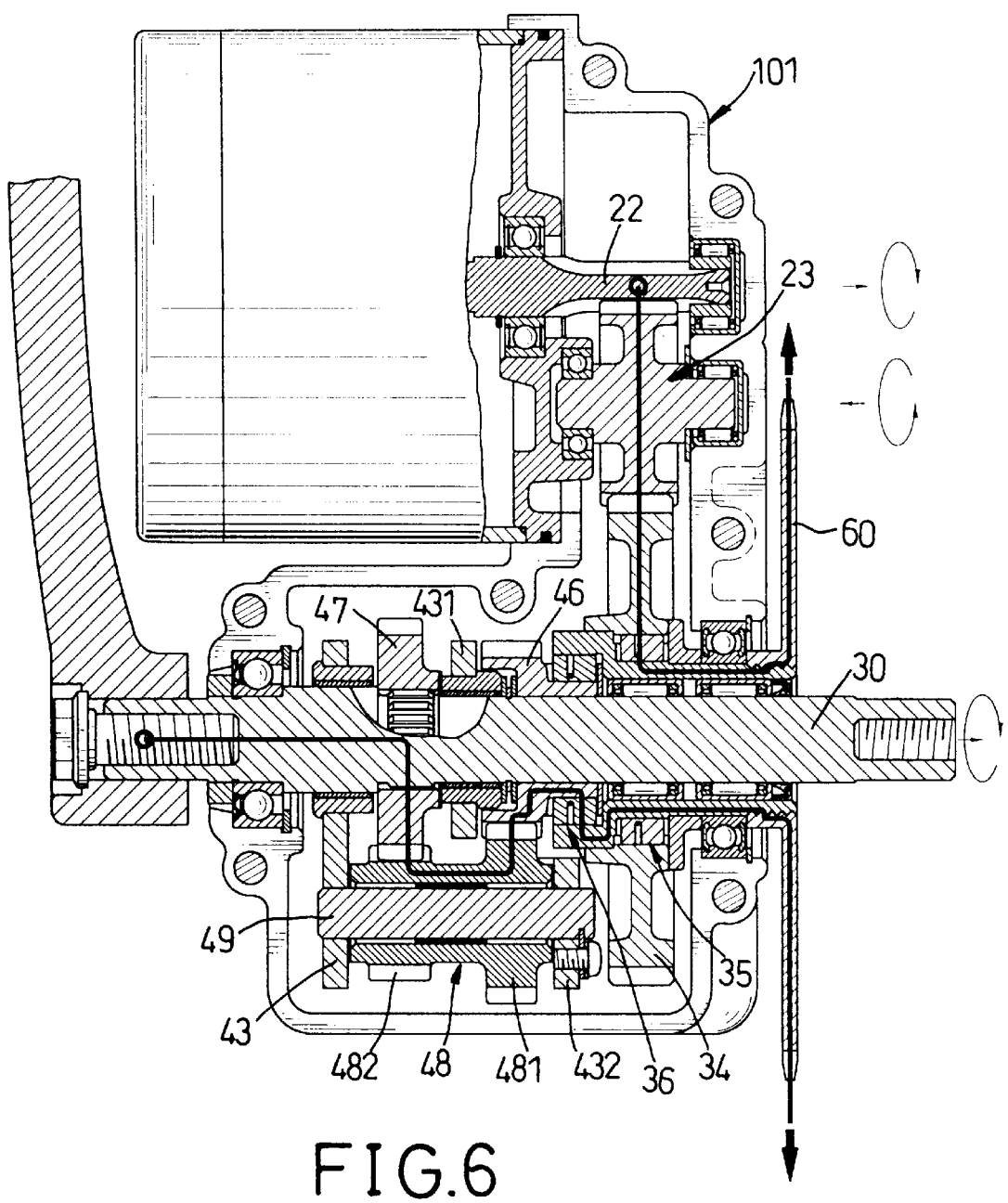
FIG. 6 is a side cross sectional view of FIG. 3 taken along the line "6—6".

The crank axle (30) further is inserted through a seat (41) received in the housing (10). Referring to FIGS. 2, 4 and 6, the seat (41) is composed of a connecting portion (42) and three arms (43, 431, 432) disposed perpendicular to the connecting portion (42), wherein the first arm (43), the second arm (431) and the third arm (432) are parallel to each other, and a distance between the first arm (43) and the second arm (431) is smaller than that between the first arm (43) and the third arm (432). Two bushes (45) are respectively provided between the crank axle (30) and the first arm (43) and the second arm (431), and maintenance-free bearings (not numbered) are respectively provided between the bushes (45) and the crank axle (30). A first gear (46) is assembled on the bush (45) in the second arm (431) and outside the second arm (431) and is rotatable about the crank axle (30). The first gear further has a step (not numbered) engaged in the second non-return means (36). A second gear (47) is provided between the first arm (43) and the second arm (431) and secured on the crank axle (30) by a key (not numbered) received in a slot (not numbered) in the crank axle (30). Thus, the second gear (47) is rotated with the crank axle (30) when the crank axle (30) is turned. A duplicate gear (48) is provided between the first arm (43) and the third arm (432), and is composed of a third gear (481) engaged with the first gear (46) and a fourth gear (482) engaged with the second gear (47). A shaft (49) is inserted through the duplicate gear (48) and secured on the first arm (43) and the third arm (432). A fastener (491) is assembled on the third arm (432) by screws for securing the shaft (49).

Figure 3:
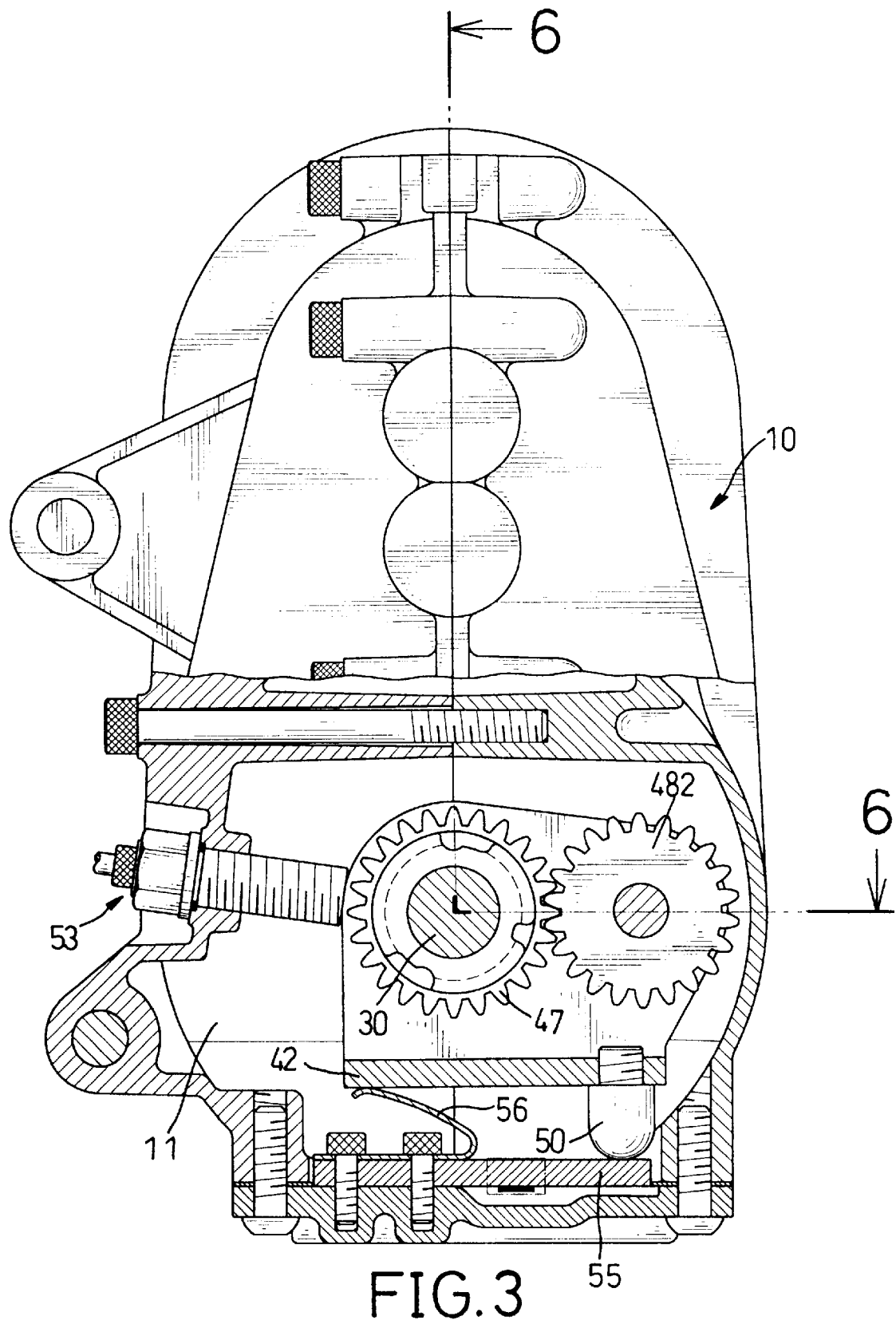
FIG. 3 is a front sectional view of the transmission.

The seat (41) further has a nose (50) provided on the connecting portion (42) and abuts a force sensor (55) secured on a side wall of the housing (10), as shown in FIG. 3. The force sensor (55) is electrically connected with a control circuit (not shown or numbered). A flexible sheet (56) is assembled beside the force sensor (55) and has an upper end pushing against the connecting portion (42). Furthermore, a speed sensor (53) is assembled on the housing (10) and extends into the chamber (101).

Referring back to FIGS. 2 and 6, when a user propels the bicycle without using electric power, the crank axle (30) is turned by the user's feet and drives the second gear (47) to rotate. The fourth gear (482) then is driven by the second gear (47) to rotate about the shaft (49). Thus, the third gear (481) integrated with the fourth gear (482) drives the first gear (46) to rotate about the crank axle (30). The second non-return means (36) is rotated with the first gear (46) and drives the stepped sleeve (32) to rotate, and the stepped sleeve (32) drives the chain wheel (60) to rotate, and thus the bicycle moves forward. In this case, the first non-return means (35) and the driven gear (34) are unable to be rotated.

When the user utilizes the electric power as an auxiliary power, the motor (20), which is controlled by the control circuit cooperated with the force sensor (55) and the speed sensor (53), provides suitable power to drive the crank axle (30).

Referring to FIG. 3, when the user pedals the crank (62) to rotate the crank axle (30), there is a counterforce perpendicular to the crank axle (30) on the second gear (47). Therefore, the seat (41) has a trend to pivot about the crank axle (30), but the seat (41) is unable to be pivoted because of the nose (50) blocked by the force sensor (55). Thus, under the counterforce, the seat (41) as well as the nose (50) has only a little displacement. At the same time, the force sensor has a deformation corresponding to the displacement of the nose (50), and sends a signal to the control circuit to actuate the motor (20). The output power of the motor (20) is corresponding to the counterforce on the crank axle (30). The seat (41) and the nose (50) are able to return to their original positions under the force of the flexible sheet (56) when the counterforce is eliminated.

The output power of the motor (20) is transmitted by the driving gear (22), then from the idler (23) to the driven gear (34), and in turn drives the stepped sleeve (32) to rotate via the first non-return means (35). Then, the stepped sleeve (32) drives the chain wheel (60) to rotate. Because of the high rotational speed of the motor (20), the rotational speed of the first non-return means (35) is higher than that of the second non-return means (36). In this case, the stepped sleeve (32) is completely driven by the motor (20), and the user need not pedal the crank (62).

Furthermore, the speed sensor (53) is able to detect the rotational speed of the second gear (47) and is cooperated with the force sensor (55) to change the output power of the motor (20).

Figure 5:
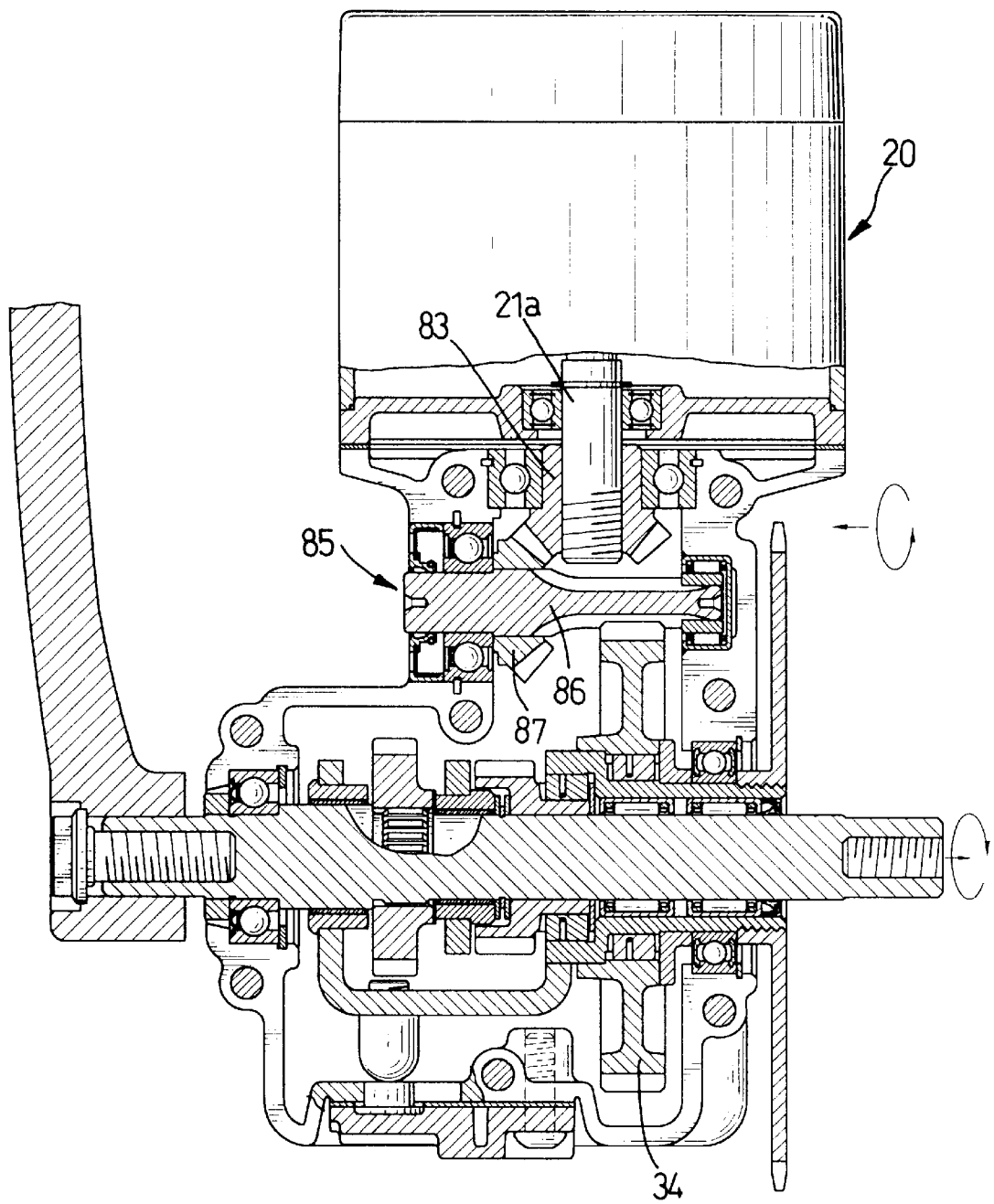
FIG. 5 is a side cross sectional view of a second embodiment of the transmission.

In a second embodiment of the invention, referring to FIG. 5, the output axle (21a) is perpendicular to the crank axle (30). A cone driving gear (83) is provided on the output axle (21). An idler (85) is composed of a gear shaft (86) and a cone gear (87) secured on the gear shaft (86). The cone driving gear (83) is engaged with the cone gear (87), and the gear shaft (86) is engaged with the driven gear (34).

From the above description, it is noted that the invention has the following advantages:

1. Because the transmission utilizes the gears (46, 47) engaged with the duplicate gear (48) to transmit the power from the crank, the structure is simpler than the conventional one with a planet gear and the manufacturing cost is low.
2. In the situation where the output axle (21) is parallel to the crank axle (30), the efficiency of the transmission is highest
3. The driving gear (22)'s tooth quantity is two, so it is easy to manufacture the driving gear, and it facilitates achievement of a large velocity rate for the transmission.
4. When a user pedals the crank to drive the bicycle without using electric power, the rotation of the stepped sleeve (32) does not drive the driven gear (34) and the output axle (22) of the motor because of the action of the first non-return means (35). Then the user does not waste strength to drive the driven gear (34) and the motor.
5. The motor (20) can be arranged with the output axle (21a) perpendicular to the crank axle (30), and other elements in the transmission need not be redesigned.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A transmission for an electric bicycle, the transmission comprising:
   a housing (10) being composed of a first semi-housing (101) and a second semi-housing (102) symmetrically assembled together;
   a motor (20) having an output axle (21) extending into the housing (10), and a driving gear (22) secured on the output axle (21) and engaged with an idler (23);
   a crank axle (30) extending through the housing (10), the crank axle (30) having a stepped sleeve (32) rotatably provided thereon, a driven gear (34) provided on the stepped sleeve (32) and engaged with the idler (23), a first non-return means (35) assembled between the stepped sleeve (32) and the driven gear (34), and a second non-return means (36) assembled between the stepped sleeve (32) and the crank axle (30);
   a chain wheel (60) secured at a first end of the stepped sleeve (32);
   a seat (41) for the crank axle (30) extending therethrough, the seat (41) having a first gear (46) rotatably provided on the crank axle (30) and having a first end secured in the second non-return means (36), a second gear (47) secured on the crank axle (30), a duplicate gear (48) being composed of a third gear (481) engaged with the first gear (46) and a fourth gear (482) engaged with the second gear (47), and a nose (50) provided on an outer surface of the seat (41); and
   a force sensor (55) assembled on an inner wall of the housing (10) and corresponding to the nose (50).

2. The transmission as claimed in claim 1, wherein the crank axle (30) is parallel to the output axle (21), and at least one first bearing (31) is provided between the crank axle (30) and the stepped sleeve (32), and a second bearing is provided between the stepped sleeve (32) and the housing (10).

3. The transmission as claimed in claim 2, wherein a distance sleeve (33) is provided outside the stepped sleeve (32) and between the driven gear (34) and the second bearing.

4. The transmission as claimed in claim 1, wherein the stepped sleeve (32) has a recess (321) defined in a second end thereof, and the second non-return means (36) is assembled in the recess (321).

5. The transmission as claimed in claim 1, wherein the seat (41) is composed of a connecting portion (42), and three arms (43, 431, 432) disposed perpendicular to the connecting portion (42), wherein a distance between the first arm

(43) and the second arm (431) is smaller than a distance between the first arm (43) and the third arm (432).

6. The transmission as claimed in claim 5, wherein the crank axle (30) is inserted through the first arm (43) and the second arm (431), two bushes (45) are respectively provided between the crank axle (30) and the first arm (43), and between the crank axle (30) and the second arm (431), the first gear (46) is assembled on the bush (45) in the second arm (431) and located outside the second arm (431), the second gear (47) is located between the first arm (43) and the second arm (431), and the duplicate gear (48) is assembled between the first arm (43) and the third arm (432).

7. The transmission as claimed in claim 6, wherein the seat (41) further has a shaft (49) extending through the first arm (43) and the third arm (432), the duplicate gear (48) is provided on the shaft (49).

8. The transmission as claimed in claim 7, wherein the seat (41) further has a fastener (491) assembled on the third arm (432) by screws for securing the shaft (49).

9. The transmission as claimed in claim 5, wherein the nose (50) is provided on the connecting portion (42).

10. The transmission as claimed in claim 1, wherein the first non-return means (35) and the second non-return means (36) are ratchet wheels.

11. The transmission as claimed in claim 1, wherein the output axle (21a) of the motor (20) is perpendicular to the crank axle (30), and has a cone driving gear (83) secured thereon; the idler (85) has a gear shaft (86) and a cone gear (87) secured on the gear shaft (86); the driving gear (83) is engaged with the cone gear (87), and the gear shaft (86) is engaged with the driven gear (34).

12. The transmission as claimed in claim 1, wherein a tooth quantity of the driving gear (22) is two.

13. The transmission as claimed in claim 11, wherein a tooth quantity of the gear shaft (86) is two.

14. The transmission as claimed in claim 1 further comprising a speed sensor (53) assembled on the housing (10) and extending into a chamber (101).

* * * * *